United States Patent [19]

Hsu et al.

[11] Patent Number: 4,615,926
[45] Date of Patent: Oct. 7, 1986

[54] FILM AND PACKAGE HAVING STRONG SEALS AND A MODIFIED PLY-SEPARATION OPENING

[75] Inventors: Joseph C. Hsu, Neenah; Anthony C. Guckenberger, Appleton, both of Wis.

[73] Assignee: American Can Company, Greenwich, Conn.

[21] Appl. No.: 632,701

[22] Filed: Jul. 20, 1984

[51] Int. Cl.$^4$ .................. B65D 11/00; B32B 27/08
[52] U.S. Cl. ........................ 428/35; 428/349; 428/476.1; 428/516; 428/520
[58] Field of Search .............. 428/35, 347, 349, 354, 428/516, 520, 522, 475.8, 476.1

[56] References Cited

U.S. PATENT DOCUMENTS

| | | | |
|---|---|---|---|
| 3,988,499 | 10/1976 | Reynolds | 428/35 |
| 4,254,169 | 3/1981 | Schroeder | 428/35 |
| 4,284,672 | 8/1981 | Stillman | 428/35 |
| 4,289,830 | 9/1981 | Knott, II | 428/516 |
| 4,407,873 | 10/1983 | Christensen et al. | 428/35 |
| 4,457,960 | 7/1984 | Newsome | 428/35 |
| 4,469,742 | 9/1984 | Oberle et al. | 428/516 |
| 4,501,797 | 2/1985 | Super et al. | 428/35 |

Primary Examiner—John Kittle
Assistant Examiner—James J. Seidleck
Attorney, Agent, or Firm—Stuart S. Bowie; Thomas D. Wilhelm

[57] ABSTRACT

The invention discloses a multiple layer packaging film, packages made therefrom and a method of opening the packages. The invention provides inseparable seal strength and in some cases hermetic seals, in combination with peelable ply separation opening for access to the contents of the package, while at the same time providing excellent barriers to transmission of oxygen and moisture. Certain embodiments provide for improved abuse resistance, excellent graphics, and other improvements. The method of opening the package depends on separating opposing ones of the package sidewalls, forcing the opening tear to be propagated partially through the film to a peelable layer interface, with subsequent ply separation along the interface to effect completion of opening of the package.

20 Claims, 11 Drawing Figures

FILM AND PACKAGE HAVING STRONG SEALS AND A MODIFIED PLY-SEPARATION OPENING

BACKGROUND OF THE INVENTION

This invention pertains to the packaging of certain products, and particularly to multiple layer packaging films used for forming heat sealable packages. The invention specifically addresses packaging applications in which closure seals are strong, and particularly those in which the product is sentive to infusion of air, or the like, into the package through the seals which are formed during package closure.

In the design of flexible packaging films and the packages formed from them, the artisan deals with the dual objective of providing strong package closure in combination with ease of opening of the package to gain access to the product contained therein. Various package designs are available for opening the packages so formed. These often take the form of weakness lines, scores, cuts, perforations and the like. Many of such designs require a separate operation on either the film or the package to ensure proper opening of the packages. Some may also penetrate the package itself, thus violating any gas barrier property of the film. Separate operations, of course, have a cost and impute an economic penalty to the films so made.

A highly desirable and economical method of providing for opening of the package is by making the closure seals such that they can be pulled apart. While the peelable seal is highly desirable in that it is economical to manufacture and easy to use, packages having peelable seals have not heretofore offered, in combination, the properties of hermetic, or gas-tight, seals, or inseparable seals.

In the packaging of products that are sensitive to certain gases in the air, it is imperative that the infusion of the gases be prevented. Gas barrier properties of various of the commercially available polymers commonly used in packaging films are known. These gas barrier properties are useful for preventing gaseous infusion into a package through the packaging film. There is still, however, some possibility of gaseous infusion through the seal area of the package, such as through heat seals which may be about the periphery of, for example, a pouch, where the seals do not provide an impervious barrier, whether by chemical composition or physical assemblage.

While the polymers commonly used to form heat seals are not normally considered as particularly good gas barriers, they may function as such by virtue of the thickness of the seal, from inside the package to its exterior taken through the seal, if a physically gas-tight seal is made, normally an hermetic seal, which property is usually associated with an inseparable seal.

In the formation of heat seals, two polymer layers, typically of identical composition, are brought together with heat and pressure, such that the layers are softened and somewhat fused together. To the extent softening and fusing is accomplished, the seal strength is enhanced. Seal strength is also enhanced by the homogeneity and internal cohesiveness of the layers so sealed.

It is known that inseparable seals may be formed by polymers that exhibit good softening and fusing properties. A polymer such as surlyn ionomer, for example may form inseparable heat seals and provide an hermetically sealed, gas-tight package. In a well-formed surlyn seal, the interface between the two layers so sealed essentially disappears, such that the surlyn layers in the seal area appear to function as a single layer joining the two films which form the sides of the package.

While such a strong seal is highly desirable in that it provides excellent package integrity at the seals and typically prevents gaseous infusion through the seals, a package so well sealed as this may be difficult to open. Indeed, the ultimate intent is the opening of the package and use of the contained product. While access to the package may be achieved such as by special package mechanical design, or by a sharp tool, it would be highly desirable to simply peel the package open. Because hermetically sealed packages normally have inseparable seals, hermetically sealed packages have not heretofore been available with peelable opening features to gain access to the package contents.

It is a general object of this invention to provide a package having strong seals in combination with a ply-separating peel capability and good oxygen and moisture barriers.

It is a more specific object of this invention to provide an hermetically sealed package which can be readily peeled open.

It is further object to provide, in such a package, film layers which offer excellent barrier to transmission of particularly, oxygen and water vapors.

It is yet another object to provide a method of opening a sealed package, to expose the contents, where the seals of the facing, innermost, layers of the sealed package are not conducive to ply separation.

It is still another object to provide, in a package made from a multiple layer film, package closure by means of inseparable heat seals, in combination with package opening by a partial tearing through of the packaging film and ply separation.

SUMMARY OF THE INVENTION

These and other objects are attained in a flexible, multiple layer packaging film having a first heat sealable layer of ionomer. A second layer of an olefin-based adhesive polymer is adjacent the first layer and has good adhesion to the first layer. A third layer, adjacent the second layer, has a composition of either ethylene vinyl alcohol copolymer (EVOH) or a polyamide-based polymer or a blend of EVOH and a polyamide-based polymer. A fourth layer, adjacent the third layer, is an olefin-based adhesive polymer, and a fifth layer, adjacent the fourth layer, is an olefin polymer of the polyethylene or polypropylene type.

The layers are all juxtaposed respectively in face to face contact with their adjacent layers and are bonded to each other with adhesion adequate for the integrity of the multiple layer film, and a package formed therefrom. The film is susceptible to being made into a flexible package, for example a pouch, having, as a combination of properties, hermetic seal and peelable opening without tearing through the entire thickness of the film. The package also has good oxygen and moisture vapor barriers.

In some cases it is specifically desired that the third layer be a polyamide. In other cases, the EVOH is preferred.

The second layer serves to adhere the first layer to the third layer, and in some cases a preferred composition for the second layer is an anhydride modified form of ethylene vinyl acetate copolymer (EVA). Another preferred composition for the second layer is anhydride modified polyethylene, particularly low density polyethylene (LDPE).

The fifth layer desirably functions as a barrier to transmission of water vapors. Preferred compositions are the polyethylenes, and particularly, low density polyethylene (LDPE), linear low density polyethylene copolymer (LLDPE), high density polyethylene (HDPE), and EVA having no more than 5% vinyl acetate (VA) by weight.

The composition of the fourth layer is selected for its adhesion properties to the third and fifth layers, for which it serves as an adhesive material. Preferred olefin base for the composition of the fourth layer is either EVA or LDPE.

In a particularly preferred film structure, the compositions of the second and fourth layers are both based on EVA. A most preferred composition for the fifth layer is LDPE.

A more complex structure of films of this invention is represented by one wherein an abuse resistant layer is adhered to the fifth layer by an adhesive layer. Typical of these is a layer of oriented polypropylene (OPP) adhered to the fifth layer by an adhesive layer of LDPE.

A still more complex structure of films of the invention is represented by one having a sixth adhesive layer of polyethylene, a seventh layer of metal foil, an eighth adhesive layer of ethylene acrylic acid copolymer (EAA) and a ninth layer of OPP.

The invention is further embodied in an hermetically sealed flexible package made with a multiple layer packaging film. The hermetically sealed package is susceptible of being opened by a combination of a partial tearing through of the film, from the inside of the package outwardly, and by ply separation peeling.

In preferred embodiments, the hermetically sealed package has, in order, a first layer of ionomer, and a second layer of olefin-based adhesive polymer having good adhesion to the first layer. A third layer is based on a polyamide or an EVOH. A fourth layer is an adhesive based on an olefin polymer and a fifth layer is polyethylene or polypropylene.

The package may, optionally have a layer of an abuse resistant polymer, such as OPP, adhered to the fifth layer by an adhesive layer such as LDPE.

A more complex package of the invention has a sixth layer of polyethylene adhesive, a seventh layer of metal foil, an eighth adhesive layer, for example EAA, and a ninth layer of abuse resistant material such as OPP.

DETAILED DESCRIPTION OF THE INVENTION

Figure 1:
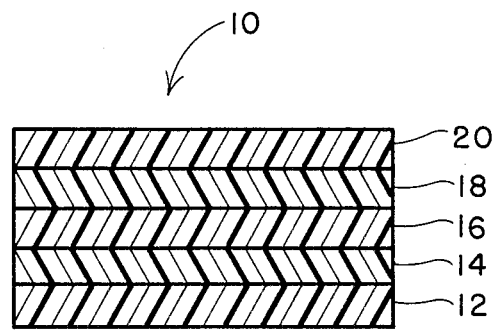
FIG. 1 shows a cross-section of films of this invention.

The details of the invention are best comprehended when considered in light of the drawings herein. FIG. 1 represents a five layer structure of films of this invention. In FIG. 1 the overall film is designated 10. Layer 12 is the heat seal layer of surlyn ionomer. Layer 16 is EVOH or polyamide or a blend of EVOH and polyamide. Layer 20 is a polymer based on polyethylene or polypropylene. Layers 14 and 18 are adhesives based on olefin polymers.

The sealant layer 12 is typically surlyn ionomer which may be selected as such because of its ability to reliably form hermetic heat seals. The term "hermetic" as used herein refers generally to gas-tight seals where passage of, for example, atmospheric gases is minimized. For purposes of this invention, the composition of layer 12 is not so important as is its capability to form seals which have strength sufficient for hindering attempts to open the package by peeling apart of the seals.

Figure 2:
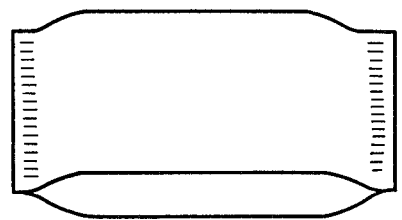
FIG. 2 shows an external view of a flexible package made from films of this invention.
Figure 3:
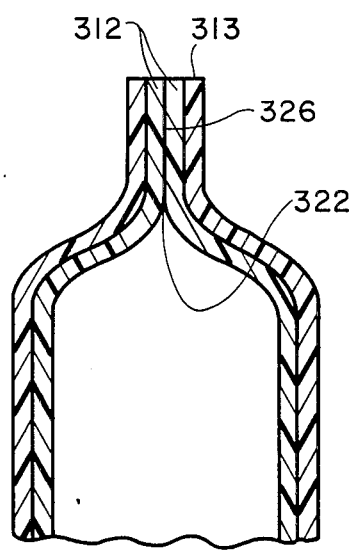
FIG. 3 illustrates a cut-away view of a portion of a pouch representing a first prior art structure having a potentially peelable seal. Each outer, unnumbered layer represents a plurality of layers in that film, while layers 312 represent single layers.
Figure 4:
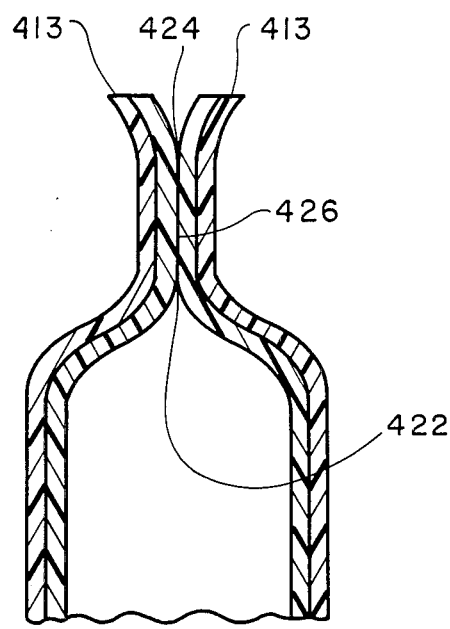
FIG. 4 illustrates a cut-away view of a portion of a pouch representing a second prior art package structure having a potentially peelable seal. Each outer, unnumbered layer represents a plurality of layers in that film, while layers 412 represent single layers.
Figure 5:
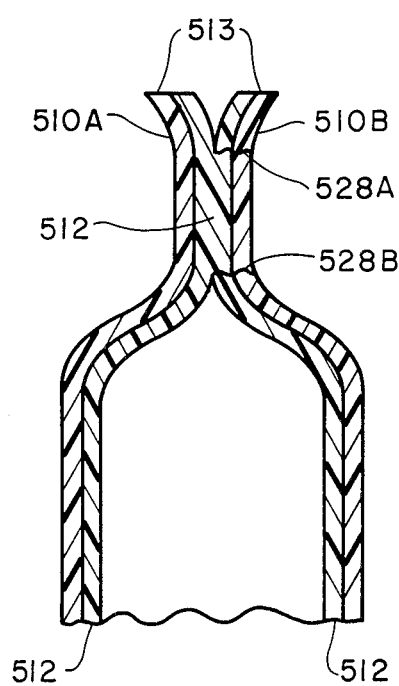
FIG. 5 illustrates a cut-away view of a portion of a pouch representing a third prior art package structure having an inseparable sealing bond, and which has no means for functioning in a peel-open mode.

In the construction of sealed film packages, such as that shown in FIG. 2, there are known two general types of seal structure. In the first type, the seal extends to the outer edge of the package as in FIG. 3. As seen in FIG. 3, the sealed area of the sealant layers 312 extends from a location 322 inwardly of the edge 313 of the film to the edge 313 thereof, such that the edge of the package functions as a single film. In the second type, as seen in FIG. 4, the seal extends from a location 422 which is inward of the edge 413 of the film, outwardly to another location 424 short of the edges of 413, such that the edges 413 of the film are not sealed together. The unsealed portion of the film between edges 413 and locations 424 can be grasped for peeling open the package in cases where the seal layer can be peeled apart as peelable seals. In cases where the seals are strong, the interfacial boundary between the sealant layers as at 326 in FIG. 3 essentially disappears and the two layers function as one layer. Such a construction is seen in FIG. 5, where the sealant layers 512 have been joined in the seal area. In structure of FIG. 5, the seal area may be so strongly sealed as to form an inseparable bond and, thereby, resist separation into two layers in the seal area, such that the film will fail by tearing thereof as at 528A when sufficient pulling force is used in attempting to pull apart the two sides 510A and 510B of the package by pulling on it near the edges 513. Such efforts fail to open the package to make the contents available.

The package may be opened by grasping it on both sides, inwardly of the seal area, and pulling the two sides 510A and 510B apart. This opening is by tearing through the entire thickness of the package sidewall as at 528B. While the package may thus be opened, the tearing through of the entire thickness of the packaging film may be sudden, and is typically accompanied by an uncontrolled and jerky motion, with spillage of contents, as well as other undesirable results.

The packages of FIGS. 3 and 4, having weaker seals, as shown by the interfaces 326 and 426, may conceivably be opened along the seal interfaces and thus are of little consequence to the invention beyond their use as background information on conventional peelable seals which are undesirably weak. While the packages illustrated as FIG. 5 have sufficient seal strength, they do not have a peel-open capability. The packages of this invention do have peel-open capability in combination with strong seals and excellent barrier properties, effected by the use of the multiple layer films disclosed herein.

Turning back now to FIG. 1, layer 14 is an adhesive tie layer whose composition is selected for good adhesion to its adjacent layers. Typical adhesive materials for use in layer 14 are the anhydride modified polyolefins. These are available commercially as, for example, Plexar 3 or Plexar 158 from Chemplex Company and AP220L from Novatec Company. It is common, and satisfactory, for layer 14 to form an inseparable bond with layer 12. It is also desirable that layer 14 form a good, but separable bond with layer 16.

Layer 16 provides the package with a barrier to transmission of oxygen through the package wall. The composition of layer 16 is EVOH, a polyamide-based polymer or a blend of EVOH with a polyamide-based polymer. As referred to herein, a polyamide-based polymer is one having a substantial recurrence of amide type molecular subgroupings. Among the preferred polyamide-based polymers are the various nylon polymers and polyetheramide copolymers. Significantly, layer 16 has moderate adhesion to layer 14, such that the package is structurally sound; but the adhesion between layers 14 and 16 is not so strong as to preclude the peeling apart of those layers.

Layer 18 is an adhesive tie layer whose composition is selected for good adhesion to its adjacent layers 16 and 20. Adhesive materials used in layer 18 are similar to those used in layer 14, as the functional requirements of adhesion are similar. Thus, the anhydride modified polyolefins are exemplary of satisfactory adhesive materials for use in layer 18. In some cases, it is acceptable, and for economic reasons may be desirable, to use the same material composition for both layers 14 and 18.

Layer 20 has, as its primary purpose, the protection of layers 12, 14, 16, and 18 from intrusions into the package, as in FIG. 2, from the external environment. Common intrusions of concern are those of oxygen and moisture. The intrusion of oxygen is prevented primarily by the oxygen barrier layer 16. In the usual case where layer 16 contains EVOH, the effectiveness of the EVOH depends on it being dry. To the extent moisture reaches the EVOH, the effectiveness of its oxygen barrier property is reduced. Thus it is important that layer 20 not only prevent-moisture from getting into the package, it should also prevent moisture from reaching any EVOH which may be in layer 16. The functional requirements of layer 20 are fulfilled by polyethylene, polypropylene, propylene ethylene copolymers, or ethylene vinyl acetate having less than 5% by weight vinyl acetate. Particularly desirable compositions for layer 20 are low density polyethylene, linear low density polyethylene and high density polyethylene.

Packages of the invention may be made entirely from films of the invention. In making these packages, portions of the films are positioned face-to-face with the sealant layers facing each other. The packaging materials thus positioned for formation of heat seals are in closure relationship. The package such as is seen in FIG. 2 is formed and sealed closed by forming heat seals generally about a contiguous enclosure defined by the film portions.

Packages of the invention may also be made by sealing a first film of the invention to a second packaging material not of the invention. In these cases, both the overall cohesive strength of the second packaging material and the seal strength of the package closure seals must be stronger than the strength required to peel open the package.

Figure 6:
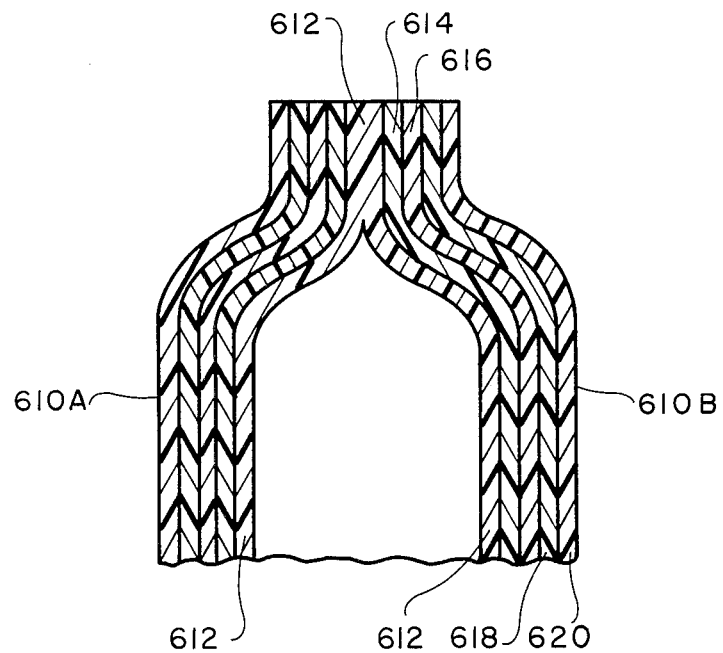
FIG. 6 is a cut-away view of a portion of a pouch of this invention which has an inseparable seal and peel-open feature.

The closed and sealed packages of this invention are represented by the illustration of FIG. 6. They may also have unsealed edge portions such as those seen in FIGS. 4 and 5. The joining of the seal layers 612 in FIG. 6 is represented as being inseparable by the absence of any line representing the interfacial surfaces of layers 612 in the seal area.

Figure 7:
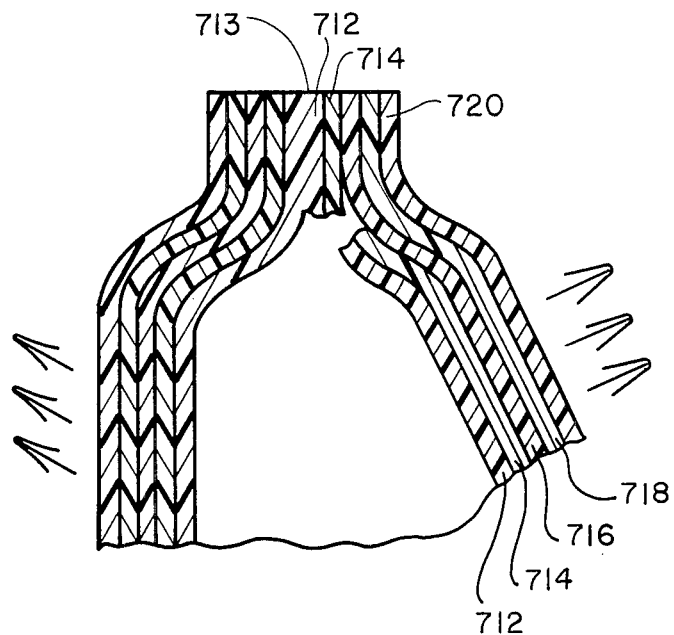
FIG. 7 is a cut-away view, as in FIG. 6, and showing the opening of the pouch in progress.

For opening packages of the invention, the package sidewalls, as at 610A and 610B FIG. 6, are grasped at locations inwardly of the package from the seal area and pulled apart, as shown by arrows adjacent the sides of the package in FIG. 7. The inseparable seal between the sealant layers 612, 712 remains intact, and the packaging film is torn partially through its thickness, tearing the sealant layer 12 and the adjacent adhesive layer 14. Layers 712 and 714 in FIG. 7 have been torn through. The adhesion between layers 714 and 716 is strong enough to allow for package integrity while being weak enough to be separated with moderate amounts of force. As seen in FIG. 7, layers 712 and 714 have been torn through, and the opening has progressed along the interface of layers 714 and 716 by ply separation, toward the edge 713 of the package.

Figure 8:
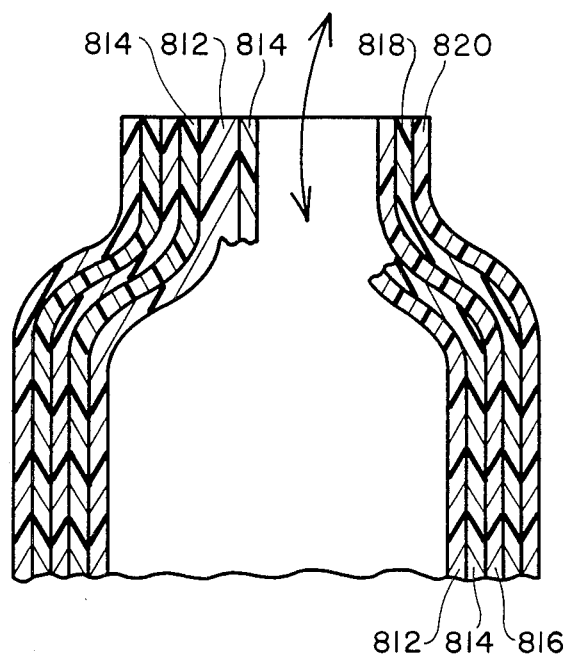
FIG. 8 is a cut-away view as in FIG. 7 and showing the pouch fully opened for access to contents therein.

FIG. 8 shows the package fully opened for access to its contents through the opening shown by the double headed arrow.

Figure 11:
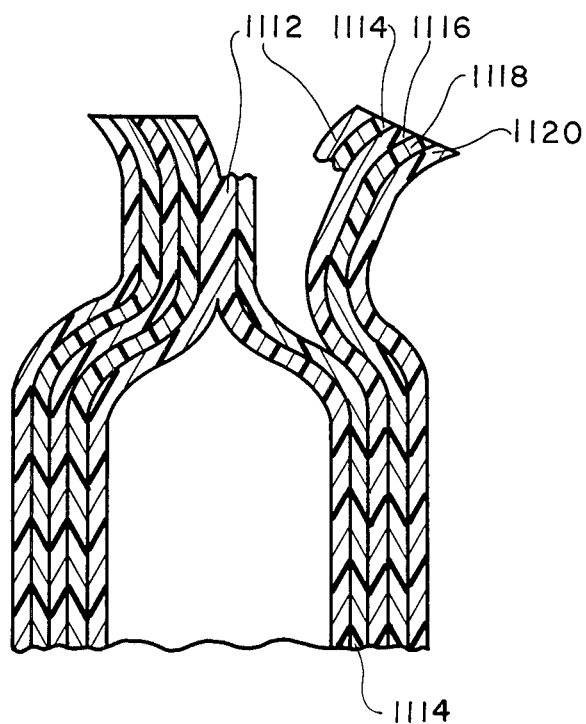
FIG. 11 is a cut-away view of a portion of a pouch as in FIG. 6, but with loose pouch edges which have been pulled apart in attempting to open the package using an improper opening method.

Attempts to open the package by other coventional means may not be successful. Thus the method of opening the package is not obvious. For example, in a package of the invention wherein the seal does not extend to the edge of the film, one may grasp the loose edges and pull them apart, expecting to open the package. Such a package is illustrated in FIG. 11. It is seen that the same combination of tear and peel opening which functions to open the package as in the method illustrated by FIGS. 7 and 8, does not function to open the package when done by the method illustrated in FIG. 11. While a plurality of layers of the packaging material may be removed by that method, the package is not opened for access to the contents.

Thus it is seen that the packages of this invention have strong seals, and function with a special peelable opening feature, the seals being preferrably made as by heat sealing. The packaging films, themselves, are preferrably made by coextrusion processes, though other processes are acceptable so long as the resulting film has functional integrity for the life of the package and provides a peelable interface between two layers other than the heat seal layers. For those purposes the interfacial adhesion between the two layers should be between 50 grams per inch width and 400 grams per inch, preferably between 100 and 300 grams per inch, as determined by ASTM D-903.

Films of this invention are generally thin, usually in the range of 1.25 mil to 3.5 mils in overall thickness. Thinner films in this range are preferred for purposes of driving heat through them in the heat sealing process, and are economical in use of materials. Thicker films are stronger and more durable.

EXAMPLE 1

A highly desirable film is 1.5 mils thick, and may be made by a conventional coextrusion process. The sealant layer as at 12, is surlyn ionomer at 33% of the film thickness. The two tie layers, as at 14 and 18, are each 7.5% of the overall film thickness and are composed of Plexar 3 anhydride modified ethylene vinyl acetate copolymer. The oxygen barrier layer, as at 16, is 10% of the overall thickness and is Soarnol-ET EVOH from Nippon Gohsei Company, Japan. The outer layer, as at 20, is 42% of the overall film thickness and is Norchem 963 low density polyethylene. In opening tests of pouch-type packages, the film peeled to open the package between layers 14 and 16.

EXAMPLE 2

Another desirable film which may also be made by coextrusion is also 1.5 mils thick. The sealant layer is surlyn ionomer at 15% of the film thickness. The two tie layers are each 7.5% of the overall film thickness and are composed of Plexar 3 anhydride modified ethylene vinyl acetate copolymer. The oxygen barrier layer is 10% of the overall thickness and is nylon 6. The outer layer is 60% of the overall film thickness and is high density polyethylene. Packages made from this film could be peeled open in like manner as those in EXAMPLE 1.

The minimum thickness of the overall film is somewhat based on functional performances of the individual layers. Minimum thickness of the oxygen barrier layer and the tie layers is about 0.1 mil each, as that represents the approximate state of the art minimum thickness for fabrication of film layers by coextrusion. Minimum thickness of the outer layer, as at 20, is about 0.5 mil to ensure good moisture barrier and at least a moderate amount of abuse resistance. Minimum thickness of the sealant layer is that necessary to achieve the required seal strength.

While the use of layers 14 and 16 for ply separation is illustrated, other layer pairs could be selected so long as the functional affect is the same. It should be noted that, in the package structure, there is a substantial fraction of the film thickness between the peelable interface and the exterior surface of the package. In the film illustrated in EXAMPLE 1, about 60% of the film thickness is between the peelable interface and the exterior surface. In the film in EXAMPLE 2, about 87% of the film thickness is between the peelable interface and the exterior surface. Other percentages will be functional so long as the required peel force is less than the force required to tear through the remaining thickness of the film.

Figure 9:
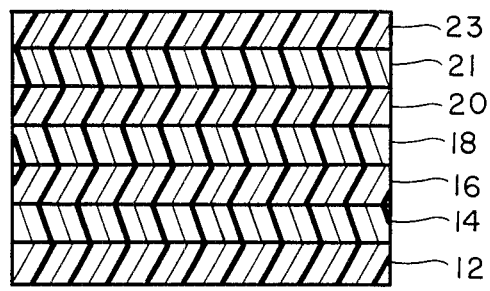
FIG. 9 shows a cross-section of a more complex 7-layer film of the invention.

In some cases, additional protective properties are desired of films of this invention, whereby more complex structures are needed. In one such structure, having 7 layers, an additional adhesive tie layer 21 is used to adhere a special abuse resistant layer 23 to the moisture barrier layer 20, as seen in FIG. 9. Acceptable materials for abuse resistant layer 23 are paper, cellophane, biaxially oriented polyester, biaxially oriented polypropylene or biaxially oriented nylon. Suitable adhesive materials for tie layer 21 are the anhydride modified polyolefins as well as the unmodified polyolefins, depending on the specific compositions chosen for layers 20 and 23. Those skilled in the arts will be able to make appropriate selections of adhesive compositions for these layers based on conventional knowledge.

Figure 10:
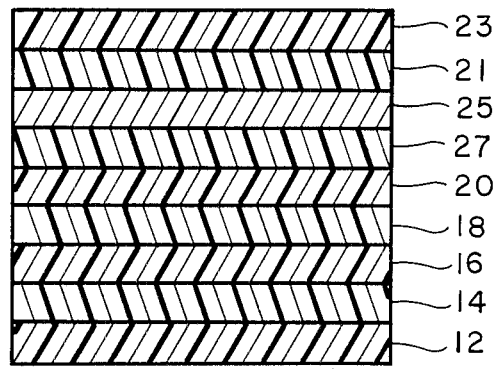
FIG. 10 shows a cross-section of a still more complex 9-layer film of the invention.

In another of the complex structures illustrated by FIG. 10, a layer 25 having a metal composition is adhered to layer 20 by an adhesive layer 27 and an abuse resistant layer 23 is adhered to layer 25 by an adhesive layer 21. Layer 25 may be metal foil or a metallized plastic film such as metallized polyester or polypropylene. Suitable adhesive material for layer 27 is typically the same as for adhesive layers 14 and 18. Layer 23 is the abuse resistant layer as in the 7-layer structure. In the 9-layer structure, layer 21 is preferably ethylene acrylic acid copolymer for good adhesion to a metal surface or may be other of the known adhesive polymers, such as low density polyethylene.

Where layer 23 is a generally transparent layer on an outside surface of the film, it is sometimes desirable to print artwork, graphics, and other indicia on the surface of the film which is disposed toward the adjacent layer in the film. This process is known as reverse printing and is completed before the single abuse resistant layer is incorporated into the multiple layer film as layer 23.

Thus it is seen that the films of this invention provide a combination of properties never before achieved in a single film. There is particularly provided a strong seal in combination with a ply-separating peel capability, good oxygen and moisture barriers, and in some of the films there is good capability for light barrier, abuse resistance and further enhanced gas barrier provided by a metal barrier.

Having thus described the invention what is claimed is:

1. A flexible multiple layer packaging film, comprising, in order:
   (a) a first layer of ionomer;
   (b) a second layer of an olefin-based adhesive polymer having good adhesion to said first layer, said olefin base being chosen from the group consisting of ethylene vinyl acetate and low density polyethylene;
   (c) a third layer whose composition is selected from the group consisting of nylon and ethylene vinyl alcohol copolymer;
   (d) a fourth layer of an olefin-based adhesive polymer, said olefin base being chosen from the group consisting of ethylene vinyl acetate and low density polyethylene; and
   (e) a fifth layer of an olefinic polymer selected from the group consisting of low density polyethylene, linear low density polyethylene copolymer, and high density polyethylene, said film being susceptible to being made into a flexible package having, as a combination of properties, hermetic seals, peelable opening without tearing across the entire thickness of said film, and good oxygen and moisture barriers.

2. A flexible film as in claim 1 wherein said olefin base in said second layer is ethylene vinyl acetate copolymer.

3. A flexible film as in claim 1 wherein said third layer is ethylene vinyl alcohol copolymer.

4. A flexible film as in claim 1 wherein said olefin base in said second and fourth layers is ethylene vinyl acetate 5. A flexible film as in claim 4 wherein said third layer is ethylene vinyl alcohol copolymer.

6. A flexible film as in claim 5 wherein the composition of said fifth layer is low density polyethylene.

7. A flexible film as in claim 1, 5, or 6 and including an abuse resistant layer adhered to said fifth layer by an adhesive material 8. A flexible film as in claim 7 and wherein said abuse resistant layer is oriented polypropylene and said adhesive material is low density polyethylene.

9. A flexible film as in claim 6 and including a sixth adhesive layer of polyethylene, a seventh layer of metal foil, an eighth layer of ethylene acrylic acid copolymer and a ninth layer of oriented polypropylene.

10. A closed and sealed package made with packaging materials including multiple layer packaging film, said package having been closed by seals between surface layers of portions of said packaging materials, said seals having sufficient strength to discourage opening of said package by ply separation of said seals, said package being susceptible of being opened to expose its interior, by a tearing partially through the thickness of said film, in combination with ply separation peeling, said packaging film comprising, from the inner layer outwardly;
   (a) a first layer of ionomer;
   (b) a second layer of an adhesive based on an ethylene polymer, said ethylene polymer being selected from the group consisting of polyethylene and ethylene vinylacetate;
   (c) a third layer whose composition is selected from the group consisting of ethylene vinyl alcohol copolymer, a polyamide-based polymer, and blends of ethylene vinyl alcohol copolymer with a polyamide-based polymer;
   (d) a fourth layer of an adhesive based on an ethylene polymer, said ethylene polymer being selected from the group consisting of low density polyethylene and ethylene vinyl acetate; and
   (e) a fifth layer selected from the group consisting of polyethylene and linear low density polyethylene copolymer.

11. A sealed package as in claim 10, said packaging film comprising, from the inner layer outwardly;
   (a) a first layer of surlyn ionomer;
   (b) a second layer of an olefin-based adhesive polymer having good adhesion to said first layer, said olefin base being chosen from the group consisting of ethylene vinyl acetate and low density polyethylene;
   (c) a third layer whose composition is selected from the group consisting of nylon and ethylene vinyl alcohol copolymer;
   (d) a fourth layer of an olefin-based adhesive polymer, said olefin base being chosen from the group consisting of ethylene vinyl acetate and low density polyethylene; and
   (e) a fifth layer of an olefinic polymer selected from the group consisting of low density polyethylene, linear low density polyethylene copolymer, and high density polyethylene,
said package being hermetically sealed.

12. An hermetically sealed package as in claim 11 wherein said olefin base in said second layer is ethylene vinyl acetate copolymer.

13. An hermetically sealed package as in claim 11 wherein said third layer is ethylene vinyl alcohol copolymer.

14. An hermetically sealed package as in claim 11 wherein said olefin base in said second and fourth layers is ethylene vinyl acetate copolymer.

15. An hermetically sealed package as in claim 14 wherein said third layer is ethylene vinyl alcohol copolymer.

16. An hermetically sealed package as in claim 15 wherein the composition of said fifth layer is low density polyethylene.

17. An hermetically sealed package as in claim 11, 15, or 16 and including an abuse resistant layer adhered to said fifth layer by an adhesive layer.

18. An hermetically sealed package as in claim 17 wherein said abuse resistant layer is oriented polypropylene, and said adhesive layer is low density polyethylene.

19. An hermetically sealed package as in claim 16 and including a sixth adhesive layer of polyethylene, a seventh layer of metal foil, an eighth adhesive layer of ethylene acrylic acid copolymer and a ninth layer of oriented polypropylene.

20. An hermetically sealed package as in claim 16 and including a sixth adhesive layer of polyethylene, a seventh layer of metal foil, and eighth layer of low density polyethylene and a ninth layer of oriented polypropylene.

* * * * *